(12) United States Patent
Ahn

(10) Patent No.: US 10,134,193 B2
(45) Date of Patent: Nov. 20, 2018

(54) SMART MIRROR SYSTEM FOR HAIRSTYLING USING VIRTUAL REALITY

(71) Applicant: Eli vision Co., Ltd, Incheon (KR)

(72) Inventor: Deog Geun Ahn, Incheon (KR)

(73) Assignee: ELI VISION CO., LTD, Incheon (KR)

( * ) Notice: Subject to any disclaimer, the term of this patent is extended or adjusted under 35 U.S.C. 154(b) by 0 days.

(21) Appl. No.: 15/382,833

(22) Filed: Dec. 19, 2016

(65) Prior Publication Data
US 2017/0330380 A1 Nov. 16, 2017

(30) Foreign Application Priority Data

May 12, 2016 (KR) .......................... 10-2016-0057864

(51) Int. Cl.
| | | |
|---|---|---|
| *G06T 19/00* | (2011.01) | |
| *G06F 1/32* | (2006.01) | |
| *G06F 3/16* | (2006.01) | |
| *G06K 9/00* | (2006.01) | |
| *G06T 19/20* | (2011.01) | |
| *G06F 3/0481* | (2013.01) | |
| *G06F 3/0484* | (2013.01) | |

(52) U.S. Cl.
CPC .......... *G06T 19/006* (2013.01); *G06F 1/3231* (2013.01); *G06F 1/3265* (2013.01); *G06F 3/16* (2013.01); *G06K 9/00214* (2013.01); *G06K 9/00892* (2013.01); *G06T 19/20* (2013.01); *G06F 3/04815* (2013.01); *G06F 3/04842* (2013.01)

(58) Field of Classification Search
CPC .................................................. G06T 19/006
USPC ................................................ 362/128, 135
See application file for complete search history.

(56) References Cited

U.S. PATENT DOCUMENTS

| | | | | | |
|---|---|---|---|---|---|
| 4,731,743 | A | * | 3/1988 | Blancato | .............. A45D 44/005 345/632 |
| 4,823,285 | A | * | 4/1989 | Blancato | .............. A45D 44/005 345/630 |
| 5,781,650 | A | * | 7/1998 | Lobo | .................. G06K 9/00221 382/118 |

(Continued)

OTHER PUBLICATIONS

Ashley Blood, "How to Use Snapchat Filters", Feb. 23, 2016, Tech-Recipes, 'http://www.tech-recipes.com/rx/57984/use-snapchat-filters/'.*

*Primary Examiner* — Mark Zimmerman
*Assistant Examiner* — Jonathan M Cofino
(74) *Attorney, Agent, or Firm* — LEX IP Meister, PLLC

(57) ABSTRACT

Disclosed is a smart mirror system for hairstyling using virtual reality, the smart mirror system including: a mirror display provided with a camera and an angle adjusting means, the mirror display being provided on a wall of a hair salon; a chair rotatably provided in front of the mirror display; and a smart device for being mirrored with the mirror display, such that a user uses the mirror display by manipulating the smart device, wherein the smart device is configured to allow hairstyles that match sex and an age group provided by using an app or a server or hairstyles of celebrities provided by Internet search to be displayed on the mirror display by mirroring; and when one of the hairstyles is selected, a selected hairstyle is applied to an image of the user displayed on the mirror display, thereby being three-dimensionally displayed in response to a user's movement.

4 Claims, 3 Drawing Sheets

(56) References Cited

U.S. PATENT DOCUMENTS

| | | | | |
|---|---|---|---|---|
| 2002/0159171 | A1* | 10/2002 | Schnell | B60R 1/025 359/877 |
| 2006/0232682 | A1* | 10/2006 | Ono | H04N 5/23212 348/222.1 |
| 2007/0274572 | A1* | 11/2007 | Nishino | A61B 5/015 382/118 |
| 2009/0092955 | A1* | 4/2009 | Hwang | A46B 15/0002 434/263 |
| 2011/0289426 | A1* | 11/2011 | Sonstegard | G06Q 10/10 715/745 |
| 2014/0176565 | A1* | 6/2014 | Adeyoola | G06T 19/006 345/473 |
| 2014/0278684 | A1* | 9/2014 | Masciarelli | G06Q 50/10 705/7.19 |
| 2014/0313302 | A1* | 10/2014 | Franke | A45D 44/005 348/77 |
| 2016/0071316 | A1* | 3/2016 | Beeler | G06T 17/20 345/423 |
| 2016/0154993 | A1* | 6/2016 | Aarabi | G06T 7/11 382/118 |
| 2016/0367854 | A1* | 12/2016 | Lytle | B60R 9/10 |

* cited by examiner

SMART MIRROR SYSTEM FOR HAIRSTYLING USING VIRTUAL REALITY

CROSS REFERENCE TO RELATED APPLICATION

The present application claims priority to Korean Patent Application No. 10-2016-0057864, filed May 12, 2016, the entire contents of which is incorporated herein for all purposes by this reference.

BACKGROUND OF THE INVENTION

Field of the Invention

The present invention generally relates to a smart mirror system for hairstyling using virtual reality. More particularly, the present invention relates to a smart mirror system for hairstyling using virtual reality, the smart mirror system configured such that a user may not only perform multiple functions, such as watching TV and movies, shopping, playing games, using SNS services, etc., by manipulating a smart device mirrored with a mirror display, but also easily finding a matching hairstyle by three-dimensionally applying the hairstyle to an image of the user, considering the latest trends or hairstyles of celebrities, the user's preferences, and budget. Further, it is not only possible to compare shapes before and after hairdressing through a recording function, a comparison function, and registration, but also possible to get the same style by checking a record and an image of an existing hairstyle at other hair salons. Further, it is not only possible to easily see the image of the mirror display through an angle adjusting means, regardless of a user's height, but also possible to reduce maintenance cost and possible to prevent noise diffusion.

Description of the Related Art

In modern life, in which external beauty is emphasized, the range of hairstyles is increasing, and recently, equipment reflecting this trend has been equipped in hair shops.

Further, hairdressing, such as permanent waves (perms), coloring, and treatments, takes long time, and almost customers have nothing to do during this time. To solve this problem, a multifunctional monitoring device for a hair salon has been disclosed for providing multiple images to customers while in the hair salon.

However, the multifunctional monitoring device for a hair salon according to related art is problematic in that the multifunctional monitoring device is configured such that an image of the back of a customer's head, which is not seen through a mirror by the customer, is displayed on a monitor in front of the customer, whereby the customer can monitor his or her hair shape, and can use other functions, such as watching TV or movies, surfing the Internet, but it is impossible for the customer to select a desired hairstyle through a display unit by applying various hairstyles to an image of a customer's face, and it is impossible to satisfy customer needs since a service to check the customer's skin or scalp is not provided.

Meanwhile, as the standard of living improves, needs and interest in hairstyles are considerably increased. Furthermore, as well as quality of life and as individuality is considered to be more important, but in real life, selection and management of a hairstyle are not systematic nor convenient, so it is difficult for a user to select and maintain a hairstyle matching him or her.

In reality, since a user who uses a hair shop (for example, a hair salon) selects a hairstyle through a magazine provided by a beauty association, through photos of celebrities, or through consultation with a hairdresser, it is difficult to find a hairstyle that matches the user before hairdressing, and the user may consider reading magazines a waste of time.

Further, even though a matching hairstyle is found, since each hairdresser has different skills and techniques, it is difficult to maintain a desired hairstyle when changing hair shops or hairdressers.

To solve the above problem, some hair shops introduced a simulation system configured such that an image of a customer's face is taken by a digital camera, then the image data is input into a computer, and some hairstyles stored in the computer in advance are simply matched with the image of the customer's face.

However, the simulation system is problematic in that since the simulation system is installed in each hair shop, it is impossible to real-time update samples of hairstyles, whereby it is difficult to keep up with quickly changing trends. The simulation system is further problematic in that in the case where the user changes a hair shop, since there is no record of the user's hairstyle, it is difficult to satisfy customer's preferences or demands. As such, the simulation system is generally ignored by customers.

Accordingly, to solve the above problem, there has been provided a service method for online hairstyle management configured to systematically manage a record of user's hairstyle even when the user changes a hair shop, which is disclosed in the document of Korean Patent No. 10-0395760.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-0395760 (dated Aug. 12, 2003) "Service method for online hairstyle management" by Byun Seungwoo

SUMMARY OF THE INVENTION

The above described conventional "Service method for online hairstyle management" is problematic in that since the service method only allows simulation of a hairstyle of a customer and checking of a record, it is impossible to relive user's boredom while he or she gets his or her hair styled.

In other words, it usually takes more than two hours to do perm or coloring, but there is nothing to do other than watching TV while waiting more than two hours, so the user becomes tired of waiting for long time while hairdressing is preformed.

Accordingly, the present invention has been made keeping in mind the above problems occurring in the related art, and the present invention is intended to propose a smart mirror system for hairstyling using virtual reality, which allows easily selecting a hairstyle that suits a user's preferences and budget, and relives the boredom of waiting for the hairstyling to be completed.

The present invention is further intended to propose a smart mirror system for hairstyling using virtual reality configured such that a user not only performs multiple functions, such as watching TV and movies, shopping, playing games, using SNS services, etc., by manipulating a smart device mirrored with a mirror display, but also a matching hairstyle is three-dimensionally simulated by applying the hairstyles of the latest trends or celebrities to the image of the user.

The present invention is further intended to propose a smart mirror system for hairstyling using virtual reality configured such that installation angle of the mirror display is adjusted to a user's height through an actuator and an angle adjusting means of the hinge shaft, whereby it is possible to easily see an image of the mirror display regardless of a user's height.

The present invention is further intended to propose a smart mirror system for hairstyling using virtual reality configured such that a power saving allows the image of the mirror display to be displayed only when the user sits on the chair, whereby it is possible not only to prevent power waste, but also to facilitate maintenance since a life of a panel is extended, and it is possible to prevent noise occurrence by providing a directional speaker for allowing sound to be heard within a predetermined range where the user is located.

The present invention is further intended to propose a smart mirror system for hairstyling using virtual reality configured such that an optional function is further provided for allowing a type of coloring or coating, a manufacturer of a hair product, and a color to be selected by using an app of the smart device or a server, and when the optional function is selected, each price is instantly identified through the mirror display, whereby it is possible to design a hairstyle to suit a user's preferences within a budget.

The present invention is further intended to propose a smart mirror system for hairstyling using virtual reality configured such that shapes before and after hairdressing are recorded through a recording function, and the shapes before and after hairdressing are compared through a comparison function, whereby it is possible to improve customer satisfaction, and options selected through the optional function and an image of after hairdressing are registered in the app or the server, whereby it is possible to get the same style by checking a record and an image of an existing hairstyle at other hair salons.

In order to achieve the above object, according to one aspect of the present invention, there is provided a smart mirror system for hairstyling using virtual reality, the smart mirror system including: a mirror display provided with a camera and an angle adjusting means, the mirror display being provided on a wall of a hair salon; a chair rotatably provided in front of the mirror display; and a smart device for being mirrored with the mirror display, such that a user sitting on the chair uses the mirror display by manipulating the smart device, wherein the smart device is configured to allow hairstyles that match sex and an age group provided by using an app or a server to be displayed on the mirror display by mirroring, or configured to allow hairstyles of celebrities provided by the Internet search to be displayed on the mirror display by mirroring; and when one of the hairstyles is selected by using the mirror display or the smart device, a selected hairstyle is applied to an image of the user displayed on the mirror display through the camera, thereby being three-dimensionally displayed in response to a user's movement.

The present invention is advantageous in that it is possible for a user to perform multiple functions, such as watching TV and movies, shopping, playing games, using SNS services, etc., by manipulating the user's smart device mirrored with the mirror display, and it is also possible to easily design a hairstyle to suit user's preferences by three-dimensionally applying hairstyles of the latest trends or celebrities to the image of the user.

The present invention is further advantageous in that since an installation angle of the mirror display is adjusted to a user's height through an actuator and an angle adjusting means of the hinge shaft, whereby it is possible to easily see an image of the mirror display regardless of a user's height.

The present invention is further advantageous in that since a power saving allows the image of the mirror display to be displayed only when the user sits on the chair, it is possible not only to prevent power waste, but also to facilitate maintenance since a life of a panel is extended, and it is possible to prevent noise occurrence by providing a directional speaker for allowing sound to be heard within a predetermined range where the user is located.

The present invention is further advantageous in that since an optional function is further provided for allowing a type of coloring or coating, a manufacturer of a hair product, and a color to be selected by using an app of the smart device or a server, and when the optional function is selected, each price is instantly identified through the mirror display, it is possible to design a hairstyle to suit a user's preferences within a budget.

The present invention is further advantageous in that since shapes before and after hairdressing are recorded through a recording function, and the shapes before and after hairdressing are compared through a comparison function, it is possible to improve customer satisfaction, and options selected through the optional function and an image of after hairdressing are registered in the app or the server, whereby it is possible to get the same style by checking a record and an image of an existing hairstyle at other hair salons.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
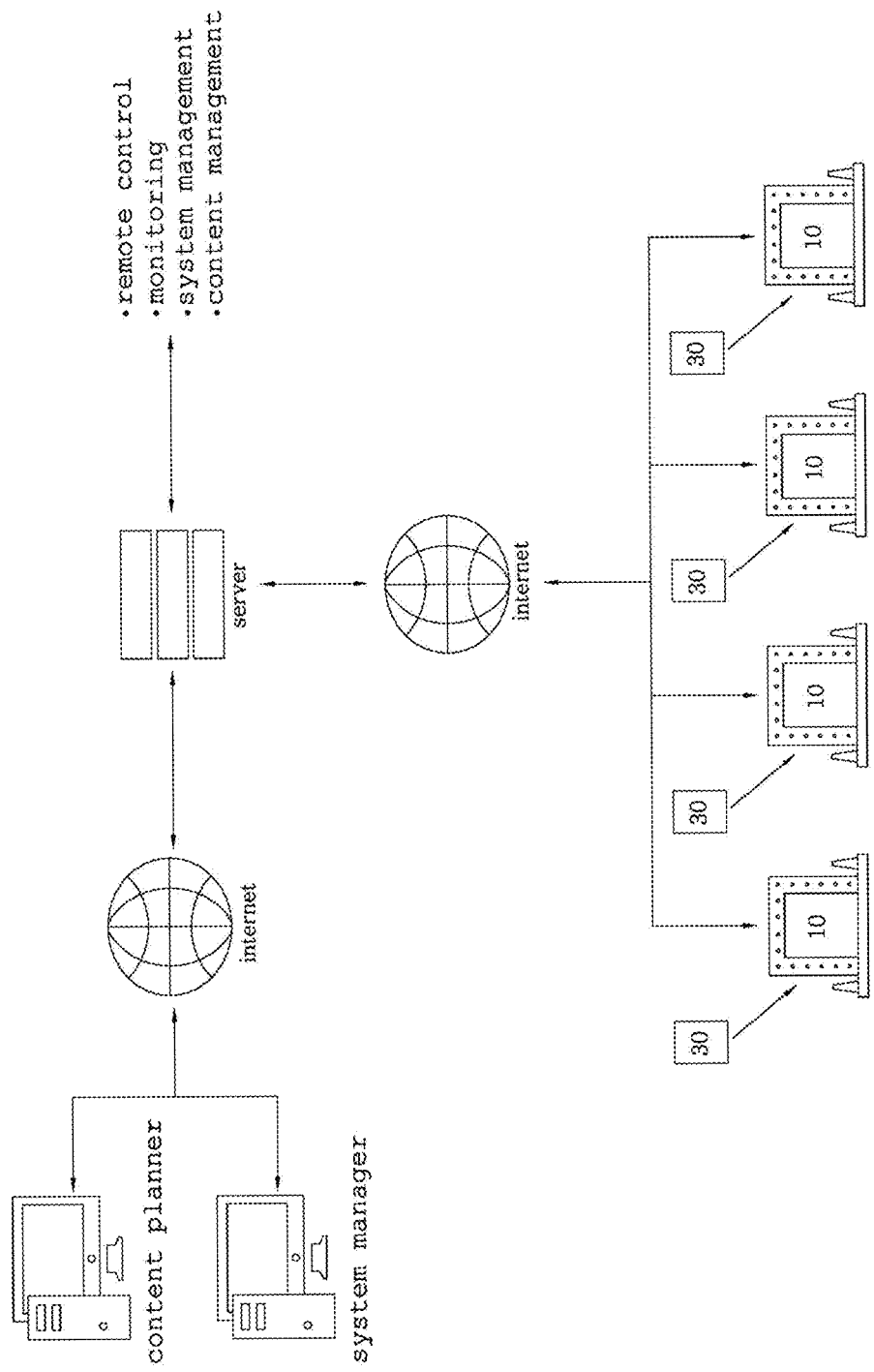
FIG. 1 is a schematic view showing a smart mirror system for hairstyling using virtual reality of the present invention.

Hereinbelow, exemplary embodiments of the present invention will be described in detail with reference to the accompanying drawings. Throughout the drawings, the same reference numerals will refer to the same or like parts.

Figure 2:
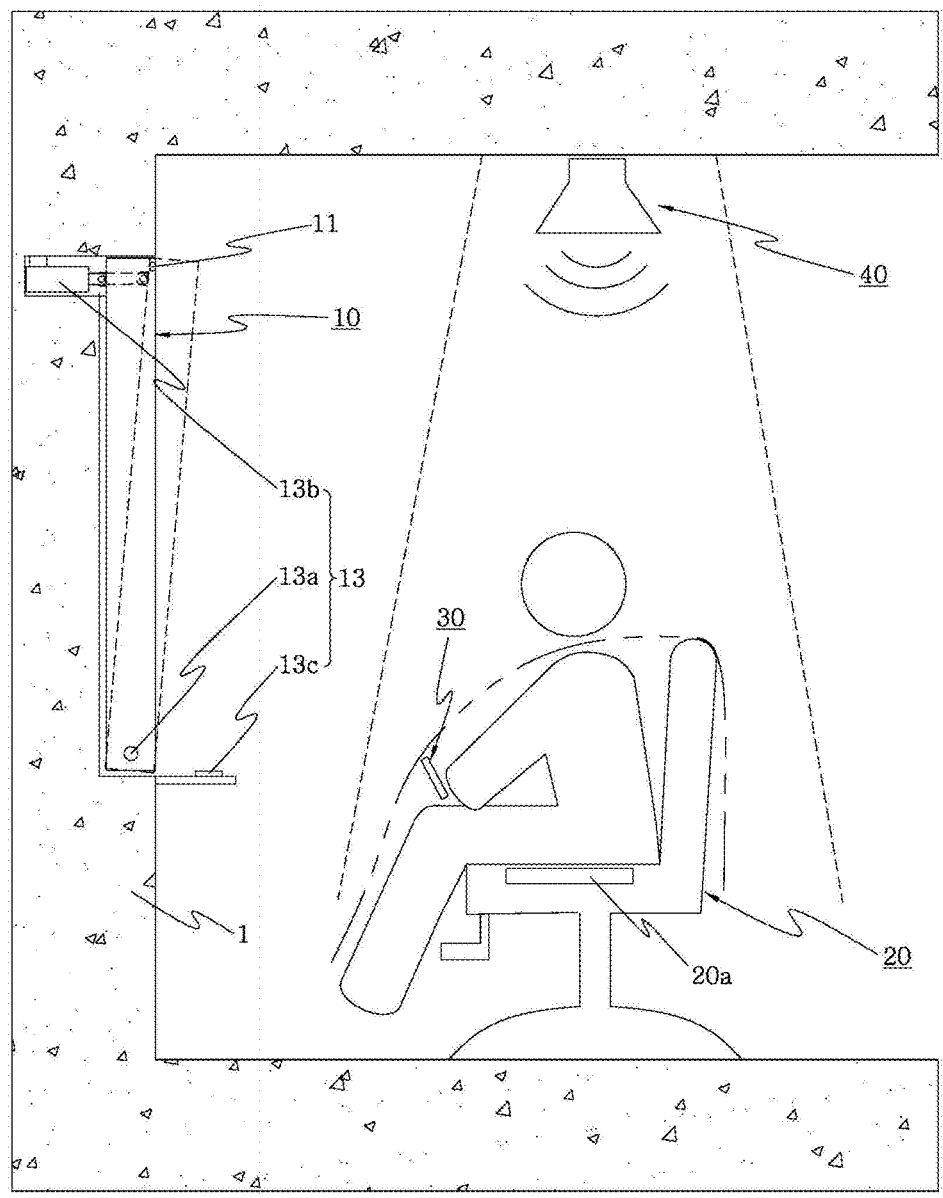
FIG. 2 is a view showing a state where a user sitting on a chair of the present invention uses a mirror display, an angle of which is adjusted through an angle adjusting means.
Figure 3:
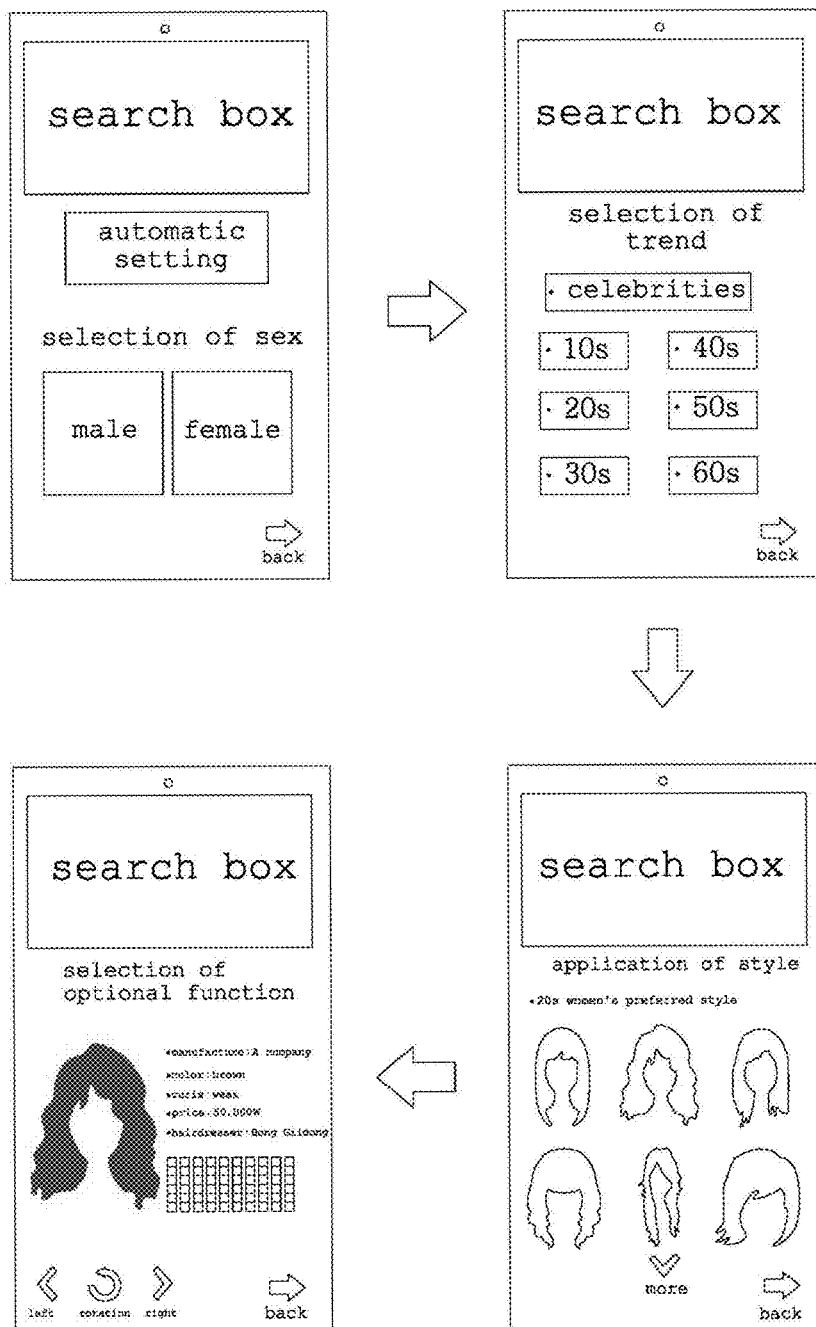
FIG. 3 is a view sequentially showing a state where a desired hairstyle is selected by using a smart device for being mirrored with the mirror display of the present invention.

As shown in FIGS. 1 to 3, the present invention relates to a smart mirror system for hairstyling using virtual reality, the smart mirror system including: a mirror display 10 provided with a camera 11 and an angle adjusting means 13, the mirror display being provided on a wall 1 of a hair salon; a chair 20 rotatably provided in front of the mirror display 10; and a smart device 30 for being mirrored with the mirror display 10, such that a user sitting on the chair 20 uses the mirror display 10 by manipulating the smart device 30, wherein the smart device 30 is configured to allow hairstyles that match sex and an age group provided by using an app or a server to be displayed on the mirror display 10 by mirroring, or configured to allow hairstyles of celebrities provided by an Internet search to be displayed on the mirror display 10 by mirroring; and when one of the hairstyles is selected by using the mirror display 10 or the smart device 30, a selected hairstyle is applied to an image of the user displayed on the mirror display 10 through the camera 11, thereby being three-dimensionally displayed in response to a user's movement.

Hereinbelow, reference will be made in detail to the smart mirror system for hairstyling using virtual reality of the present invention.

Firstly, the mirror display 10, which is a publicly known apparatus that serves as a mirror during a standby state and performs a display function during operation, is provided with the camera 11 at an upper portion or a side thereof to take an image of a user's head while he or she is sitting on the chair.

Further, the mirror display 10 may be fixedly provided on the wall 1 of the hair salon, but it is preferred that an installation angle of the mirror display is configured to be adjustable to complement a difference in eye level according to a user's height. To facilitate adjustment of the installation angle, the mirror display 10 may further include the angle adjusting means 13.

Further, the angle adjusting means 13 may include: a hinge shaft 13a provided on the wall 1 of the hair salon to be hingedly coupled to a lower portion of the mirror display 10; an actuator 13b provided on the wall 1 of the hair salon to be coupled to an upper portion of the mirror display 10, and rotating the mirror display 10 based on the hinge shaft 13a; and an operation switch 13c for operating the actuator 13b.

Herein, it is preferred that the mirror display 10 is accommodated in the wall 1 such that when the actuator 13b is not seen when the angle is adjusted by the angle adjusting means 13, and it is preferred that a lower portion of the actuator 13b is provided with a conventional rack such that the operation switch 13c is provided in the rack.

Further, the operation switch 13c may be provided on the chair 20 to allow easy manipulation by the user, or may be configured to be manipulated through the app of the smart device 30.

Secondly, as described above, the chair 20, which is in a conventional shape, may be configured to have the operation switch 13c for operating the actuator 13b of the angle adjusting means 13 to allow a hairdresser to easily style hair.

Further, in the present invention, the mirror display 10 further includes a power saving function.

Herein, the power saving function of the mirror display 10 may be configured to be activated in response to sensing a human body through a publicly known sensor, wherein the present invention is configured such that the chair 20 further includes an operation sensor 20a for operating the power saving function of the mirror display 10.

Accordingly, when the user sits on the chair 20, a screen image of the mirror display 10 is displayed by the operation sensor 20a sensing the user, and when the user stands up from the chair 20, the power saving function of the mirror display is activated not to display the screen image by the operation sensor 20a not sensing the user.

Further, the operation sensor 20a may be configured to be a conventional touch sensor, but it is preferred that the operation sensor is configured to be a weight sensor that is operated only when a weight over a predetermined weight is applied by sensing a body weight. Thereby, the power saving function of the mirror display 10 is not activated when the hairdresser slightly moves or puts a light object on the chair, and thus it is possible not only to prevent power waste, but also to facilitate maintenance since a life of a panel can be extended.

Further, in the present invention, a directional speaker connected to the mirror display 10 may be provided to prevent noise caused by sound that is heard here and there and is produced from a plurality of speakers, wherein it is preferred that the directional speaker 40 is provided in an uppermost portion of a back of the chair or on a ceiling above the chair 20, whereby a user can hear sound within a predetermined range. Accordingly, it is possible to prevent a conflict between users and hairdressers due to noise.

Thirdly, the smart device 30 is provided for manipulating the mirror display 10 through mirroring, and a conventional device, such as a tablet PC or a smartphone carried by the user, can be the smart device.

Accordingly, a user visiting the hair salon can be provided with desired hairstyles by controlling the mirror display 10 after executing the app installed in the smart device 30 or after accessing the server using an ID and password.

Further, the user can select one of the provided hairstyles by manipulating the smart device 30 through mirroring. Of course, a hairdresser can select hairstyles by manipulating the mirror display 10 instead. The user may select one hairstyle by directly controlling the mirror display 10 by air touch.

When the selection of hairstyle is completed through the above process, the camera 11 provided in the mirror display 10 takes an image of the user's head through a user's manipulation or automatic control, and at the same time, the selected hairstyle is applied to the user's head, whereby the user's head that the selected hairstyle is applied to is three-dimensionally displayed on the mirror display 10 in response to a user's movement.

Further, by using the app of the smart device 30 or the server, the hairstyles provided to the smart device 30 and the mirror display 10 may be configured such that desired hairstyles are searched by sequentially selecting sex, trend by age group, and style at user's choice 10, wherein the present invention further includes an automatic setting function apart from the above described manual search, whereby it is possible to automatically show a database including a matching hairstyle by automatically figuring out a user's sex, age group, and a user's face shape through image sensing by the camera 11.

Further, not described in the accompanying claims of the present invention, after an image of user's scalp is taken by using the camera 11 of the smart device 30 or an additional camera, it is possible to display scalp condition on the mirror display 10, whereby it is possible to improve customer satisfaction through treatment for scalp improvement.

Meanwhile, in the present invention, it is preferred that an optional function is further provided for allowing selecting options of a selected hairstyle provided to the smart device 30 and the mirror display 10, by using the app of the smart device 30 or the server. The optional function includes selection of a type of coloring or coating, selection of a manufacturer of a hair product for coloring or coating, and selection of a color, wherein it is preferred that a price is displayed on the mirror display 10 according to each selection of the optional function, whereby it is possible to select a service for a desired hairstyle considering the user's preferences and budget.

Further, user's hair shapes before and after hairdressing are compared by using the present invention. To achieve this, the mirror display 10 manipulated through the smart device 30 further includes a recording function and a comparison function.

In other words, after an image of hairstyle before hairdressing and an image of hairstyle after hairdressing are stored by using the recording function of the camera 11, images on the mirror display 10 are compared through the comparison function, whereby it is possible to improve customer satisfaction.

Further, in the present invention, options selected through the optional function and an image after hairdressing recorded through the mirror display 10 are registered in the app of the smart device 30 or in the server connected with the mirror display 10, such that a record and an image of an existing hairstyle can be checked at other hair salons, whereby it is possible to easily manage hairstyles since the user him or herself can show the hairdresser the hairstyle that he or she most prefers.

Hereinbelow, reference will be made in detail to operation of the smart mirror system for hairstyling using virtual reality of the present invention.

Firstly, in when a user who visits the hair salon sits on the chair 20 provided with the mirror display 10, the smart device 30 and the mirror display 10 are connected by mirroring, and then the app of the smart device 30 or the server is accessed by using ID and password.

After accessing the app or the server, a desired hairstyle is selected by controlling the mirror display 10 using the smart device 30 or by manipulating the mirror display 10.

Herein, a method for selecting a desired hairstyle is as follows: searching for hairstyles of a celebrity such as entertainers by using a search box; sequentially selecting sex, trend by age group, and style at user's choice; and automatically searching for a hairstyle that matches with a user's age group and a user's face shape, through the automatic setting function, wherein after searching and selecting a desired hairstyle, options may be selected through the optional function.

In other words, after the user selects a hairstyle, the optional function, in which a type of coloring or coating, a manufacturer of a hair product, and a color are selected, is additionally performed, whereby it is possible to easily select a hairstyle to suit a user's preferences.

Further, when the optional function is performed, each price is displayed on smart device 30 and the mirror display 10 according to each selection of the optional function, whereby it is possible for the user to identify cost according to the selection of the optional function, and thus it is possible design a hairstyle to suit user's preferences within a proper budget.

After the selection of hairstyle including the optional function is completed, the selected hairstyle is applied to the user head through an automatic control or by manipulating the smart device 30, and displayed three-dimensionally on the mirror display 10 through the camera 11.

Accordingly, it is possible for the user to check whether the selected hairstyle matches with the user in advance, and it is possible for the hairdresser to dress the hair that the user wants hairstyled, by checking the image.

Further, when the hairdresser dresses the hair, the user can control the mirror display 10 mirrored with the smart device 30 by using the smart device 30, so it is possible to perform multiple functions, such as watching TV and movies, shopping, playing games, using SNS services, etc., whereby it is possible to relive the boredom of waiting time. Here, sound from the above functions and generated through the directional speaker 40 is s heard within a predetermined range where the user is located 0, whereby it is possible to prevent other people from being bothered due to noise.

Meanwhile, when a user's is short, the eye level of the user sitting on the chair is different from the eye level of an image of the mirror display 10, so the user may feel uncomfortable. To solve this problem, the actuator 13b is operated through the operation switch 13c provided in the angle adjusting means 13, such that the mirror display 10 is rotated based on the hinge shaft 13a, whereby it is possible to easily see the image of the mirror display 10 regardless of a user's height.

Further, thanks to the power saving function that allows the image of the mirror display 10 to be displayed only when the user sits on the chair 20, it is possible not only to prevent power waste, but also to facilitate maintenance since a life of a panel is extended.

Further, the above description is described assuming that there are no waiting customers in the hair salon, so when there is a waiting person in the hair salon, before the smart device 30 and the mirror display 10 are mirrored with each other, access and selection of hairstyle are completed through the app of the smart device 30, and then the mirror display 10 is mirrored with the smart device 30.

As described above, according to the smart mirror system for hairstyling using virtual reality of the present invention, the user may not only perform multiple functions, such as watching TV and movies, shopping, playing games, using SNS services, etc., by manipulating the smart device 30 mirrored with the mirror display 10, but also easily find a matching hairstyle by three-dimensionally applying the hairstyle to the user, considering the latest trends or hairstyles of celebrities, the user's preferences, and budget. Further, it is not only possible to compare shapes before and after hairdressing through the recording function, the comparison function, and registration, but also possible to get the same style by checking a record and an image of an existing hairstyle at other hair salons. Further, it is not only possible to easily see the image of the mirror display 10 through the angle adjusting means 13, regardless of a user's height, but also possible to reduce maintenance cost and possible to prevent noise diffusion.

Although a preferred embodiment of the present invention has been described for illustrative purposes, those skilled in the art will appreciate that various modifications, additions and substitutions are possible, without departing from the scope and spirit of the invention as disclosed in the accompanying claims.

[Description of reference characters of important parts]

| | |
|---|---|
| 1: wall | 10: mirror display |
| 11: camera | 13: angle adjusting means |
| 13a: hinge shaft | 13b: actuator |
| 13c: operation switch | 20: chair |
| 20a: operation sensor | 30: smart device |
| 40: directional speaker | |

What is claimed is:

1. A smart mirror system for hairstyling using virtual reality, the smart mirror system comprising:
   a mirror display provided with a camera and an angle adjusting means, the mirror display being provided on a wall of a hair salon;
   a chair rotatably provided in front of the mirror display; and a smart device for being mirrored with the mirror display, such that a user sitting on the chair uses the mirror display by manipulating the smart device, wherein the smart device is configured to allow hairstyles that match sex and an age group provided by using an app or a server to be displayed on the mirror display by mirroring, or configured to allow hairstyles of celebrities provided by Internet search to be displayed on the mirror display by mirroring, wherein when one of the hairstyles is selected by using the mirror display or the smart device, a selected hairstyle is applied to an image of the user displayed on the mirror display through the camera, thereby being three-dimensionally displayed in response to a user's movement;

wherein the angle adjusting means provided in the mirror display includes:

a hinge shaft provided on the wall of the hair salon to be hingedly coupled to a lower portion of the mirror display;

an actuator provided on the wall of the hair salon to be coupled to an upper portion of the mirror display, and rotating the mirror display based on the hinge shaft; and an operation switch for operating the actuator, such that an installation angle of the mirror display is adjusted to a users height, wherein the mirror display further includes a power saving function, and the chair further includes an operation sensor for operating the power saving function of the mirror display, such that when the user sits on the chair, a screen image of the mirror display is displayed by the operation sensor sensing the user, and when the user stands up from the chair, the power saving function of the mirror display is activated to not display the screen image when the user is not sensed by the operation sensor, wherein the mirror display manipulated through the smart device further includes a function having options for allowing selecting a type of coloring or coating based on a selected hairstyle, a manufacturer of a hair product, and a color, wherein a price is shown according to selection of the function having options, wherein the mirror display manipulated through the smart device further includes a recording function and a comparison function, such that shapes before and after hairdressing are compared through images on the mirror display; and options selected through the function having options and an image after hairdressing recorded through the mirror display are registered in the app of the smart device or in the server connected with the mirror display, such that a record and an image of an existing hairstyle are checked at other hair salons.

2. The smart mirror system of claim 1, wherein the chair includes a directional speaker connected to the mirror display provided in an uppermost portion of a back of the chair or on a ceiling above the chair.

3. The smart mirror system of claim 1, wherein the mirror display manipulated through the smart device further includes an automatic setting function for automatically showing a database including a matching hairstyle by automatically determining a user's sex, age group, and face shape through image sensing by the camera.

4. A smart mirror system for hairstyling using virtual reality, the smart mirror system comprising:

a mirror display provided with a camera and an angle adjusting means, the mirror display being provided on a wall of a hair salon;

a chair rotatably provided in front of the mirror display; and a smart device for being mirrored with the mirror display, such that a user sitting on the chair uses the mirror display by manipulating the smart device, wherein the smart device is configured to allow hairstyles that match sex and an age group provided by using an app or a server to be displayed on the mirror display by mirroring, or configured to allow hairstyles of celebrities provided by Internet search to be displayed on the mirror display by mirroring;

when one of the hairstyles is selected by using the mirror display or the smart device, a selected hairstyle is applied to an image of the user displayed on the mirror display through the camera, thereby being three-dimensionally displayed in response to a users movement;

the angle adjusting means provided in the mirror display includes: a hinge shaft provided on the wall of the hair salon to be hingedly coupled to a lower portion of the mirror display;

an actuator provided on the wall of the hair salon to be coupled to an upper portion of the mirror display, and rotating the mirror display based on the hinge shaft; and an operation switch for operating the actuator, such that an installation angle of the mirror display is adjusted to a users height; and the mirror display further includes a power saving function, and the chair further includes an operation sensor for operating the power saving function of the mirror display, such that when the user sits on the chair, a screen image of the mirror display is displayed by the operation sensor sensing the user, and when the user stands up from the chair, the power saving function of the mirror display is activated to not display the screen image when the user is not sensed by the operation sensor, wherein the mirror display manipulated through the smart device further includes an automatic setting function for automatically showing a database including a matching hairstyle by automatically determining a users sex, age group, and face shape through image sensing by the camera, wherein the mirror display manipulated through the smart device further includes a function having options for allowing selecting a type of coloring or coating based on a selected hairstyle, a manufacturer of a hair product, and a color, wherein a price is shown according to selection of the function having options, wherein the mirror display manipulated through the smart device further includes a recording function and a comparison function, such that shapes before and after hairdressing are compared through images on the mirror display; and options selected through the function having options and an image after hairdressing recorded through the mirror display are registered in the app of the smart device or in the server connected with the mirror display, such that a record and an image of an existing hairstyle are checked at other hair salons.

* * * * *